United States Patent

[11] 3,550,974

[72] Inventor John J. Kupchick
    Forestville, Conn.
[21] Appl. No. 827,765
[22] Filed May 26, 1969
[45] Patented Dec. 29, 1970
[73] Assignee TRW Inc.
    Cleveland, Ohio
    a corporation of Ohio

[54] BEARING SEAL
    9 Claims, 7 Drawing Figs.
[52] U.S. Cl. .................................................. 308/187.2
[51] Int. Cl. .............................................. F16c 33/78
[50] Field of Search .................................... 308/187.2,
    187, 187.1, 36.4

[56] References Cited
    UNITED STATES PATENTS
    2,917,328 12/1959 Peterson ...................... 308/187.1

Primary Examiner—Fred C. Mattern, Jr.
Assistant Examiner—Frank Susko
Attorney—Hill, Sherman, Meroni, Gross & Simpson ABSTRACT: A seal for bearing assemblies adapted to be positioned at axial ends of the assembly between the inner and outer rings thereof to seal the roller element assembly for lubrication, the seal assembly comprising an elastomer ring adapted to be affixed to the outer raceway and span the distance from the outer raceway to the inner raceway, the central portions of said elastomer ring backed on the axially outermost side by a configured metal member bonded to the elastomer, the metal member not contacting either the inner or outer raceway ring, a lip seal on the elastomer portion adapted to contact the inner race ring, and a metal ring adapted to be affixed to the inner race ring and having axially projecting legs extending axially inwardly of portions of the combination elastomer and metal ring to define a labyrinth seal therebetween.

PATENTED DEC 29 1970　　　　　　　　3,550,974
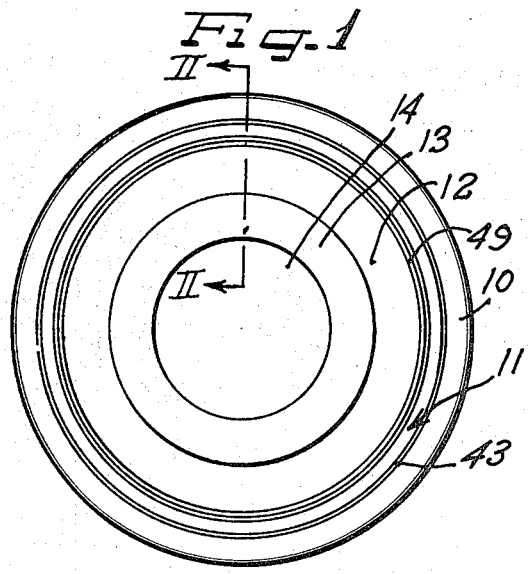
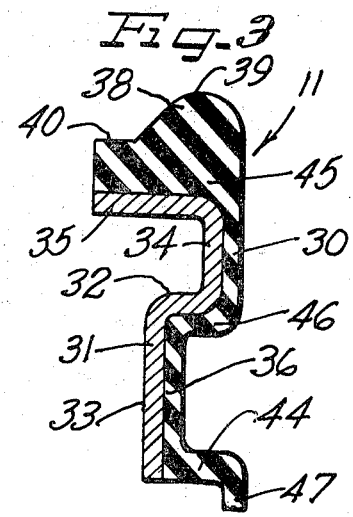
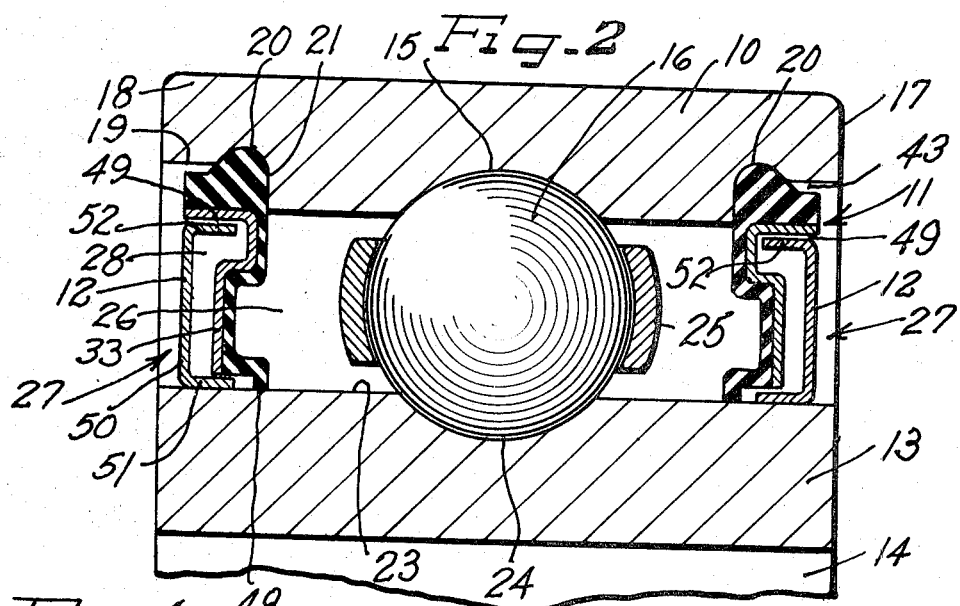
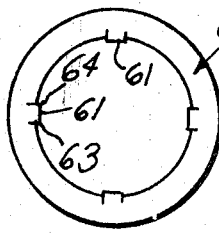
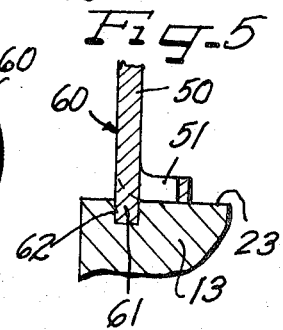
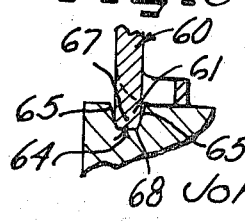
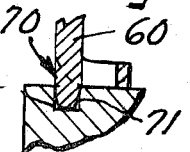
INVENTOR.
John J. Kupchick
BY　　　　　　　　　　　　　ATTORNEYS

BEARING SEAL

BACKGROUND OF THE INVENTION

Prior Art

Combination labyrinth and lip seals for use with bearing assemblies are known to the art. The U.S. Pat. to C. O. Peterson, No. 2,819,100, illustrates such a seal assembly having a pure elastomer member attached to the outer raceway ring and spanning the distance between it and the inner raceway ring wherein a lip seal contacts the inner raceway ring. A substantially U-shaped cross section metal ring is attached to the inner raceway ring and interfits with the elastomer member to provide a labyrinth seal therebetween. Due to the provision of a solid elastomer ring, it is necessary to either increase the axial span of the seal assembly to accept the necessarily wide elastomer member or to decrease the lubricant area.

The U.S. Pat. to C. O. Peterson, No. 2,917,328, improved on the earlier Peterson design by providing a two-piece elastomer member where the two pieces were interconnected by a metal annulus member. This allowed reduction in the cross section width of the outer raceway ring associated member due to the strength of the metal annulus member. Ring assemblies which require the provision of two separate elastomer ring segments bonded to a metal annulus in a close tolerance situation require extreme care in manufacturing. Should one of the elastomer members be slightly misplaced with reference to the metal annulus during the assembly of the member, the resultant assembly may either fail to seal or may ride against the metal U-shaped member with which it cooperates to provide the labyrinth seal. In addition, those portions of the elastomer members which are not backed by the metal annulus may be subject to vibrational movement during operation of the seal assembly and may, in such instances, contact the U-shaped member causing increased frictional drag and wear erosion. A further disadvantage arises from the fact that during operation of the seal assembly the bond between one of the elastomer members and the annulus may loosen, destroying the seal.

SUMMARY

The present invention overcomes the deficiencies in the prior art by providing a seal assembly for use in a bearing assembly which has a single elastomer member adapted to be affixed to the outer race ring of the bearing assembly and span the distance between the outer race ring and the inner race ring wherein a lip portion of the elastomer member will contact the inner race ring in sealing relation therewith. On the axially outermost side of the elastomer member, a metal annulus is provided which is bonded to the elastomer member and which provides a rigid support thereto. The metal annulus is so configured as to define the labyrinth between it and the U-shaped cross section metal ring which rides on the inner race of the seal assembly. Therefore, the labyrinth seal is defined between two metal members which are not subject to elastomeric flexing during operation of the bearing assembly and which will therefore not contact each other. Further, because a single elastomer member is used, the above-mentioned disadvantages of the prior art three-piece members are overcome.

In a modified embodiment of this invention a plurality of circumferentially spaced tabs extend radially inward from the inner periphery of the metal ring and are received in a groove in the inner ring of the bearing assembly thereby preventing axial and rotational movement of the U-shaped cross section metal ring.

It is therefore an object of this invention to provide a new and improved seal assembly for use in connection with bearing assemblies.

It is another object of this invention to provide a new and improved combination lip and labyrinth seal assembly for use in connection with bearing assemblies having relatively moving inner and outer raceways with an area to be sealed therebetween.

It is yet another and more specific object of this invention to provide a bearing assembly seal having a metal annulus backed one-piece elastomer member adapted to be affixed to the outer race ring of the assembly and span the distance between the outer race ring and the inner race ring which cooperates with a U-shaped cross section ring attached to the inner race ring to provide a metal bordered labyrinth seal.

It is still another and more important object of this invention to provide a bearing assembly having a metal annulus backed one-piece elastomer member adapted to be affixed to the outer race ring of the assembly and span the distance between the outer race ring and the inner race ring which cooperates with a U-shaped cross section ring attached to the inner race ring to provide a metal bordered labyrinth seal, the U-shaped cross section ring being restrained against axial and rotational movement.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 1 is an axial plan view of a bearing assembly equipped with the seal assembly of this invention.

FIG. 2 is an enlarged fragmentary cross-sectional view of the assembly of FIG. 1 taken along the lines II-II.

FIG. 3 is an enlarged cross-sectional view of the combination metal annulus and elastomer ring member of the seal assembly of this invention.

FIG. 4 is a plan view of a modified flinger for use with this invention. FIG. 5 is an enlarged fragmentary cross-sectional view of the flinger of FIG. 4. FIG. 6 is a view similar to FIG. 5 illustrating another modification of the flinger. FIG. 7 is a view similar to FIG. 5 illustrating yet another modification of the flinger of this invention.

DESCRIPTION OF THE PREFERRED EMBODIMENT

FIG. 1 illustrates a bearing assembly equipped with the seal of this invention. The bearing assembly consists of an outer raceway ring 10, the outer race ring carried seal member 11, the inner race ring carried seal member 12, and an inner raceway ring 13 having a central shaft receiving bore 14 therethrough.

It is to be understood that two seal assemblies, each consisting of a single outer race ring carried seal member 11 and an inner race ring carried seal member 12 are used in sealing the bearing assembly. One seal assembly is located at each of the axial ends of the bearing assembly. Therefore, for purposes of description, each of the members 11 and 12 has an axially inner and an axially outer side; axially inner referring to the direction of the center of the bearing assembly from the end thereof and axially outer referring to the direction of the outside of the bearing assembly from the center thereof. In the preferred embodiment the majority of the outer race ring carried seal member 11 lies axially inwardly of the majority of the inner race ring carried seal member 12.

As illustrated in FIG. 2, the outer race ring 10 has a central circumferential groove 15 which provides a rolling raceway for a string of roller elements such as ball bearings 16. The axial ends 17 and 18 of the race ring 10 have reduced radial thickness portions 19 providing an inner diameter radius greater than the radius of the central portions of the ring 10 adjacent the raceway 15. The reduced thickness portions 19 extend axially into the ring 10 to a circumferential radially outwardly extending groove 20 which ends in an axially inner radial wall 21 which extends radially inwardly to the normal inner diameter of the race ring 10 adjacent the raceway 15.

The inner diameter race ring 13 has a constant outer diameter 23 with a circumferential groove 24 therein adapted to provide a raceway for the string of balls 16. The balls 16 may be separated by a bearing cage 25. The balls 16 ride in the raceways 15 and 24 which are radially aligned. The area 26 between the inner and outer race rings 10 and 13 which is not filled by the roller elements and cage, serves as a lubricant retaining area for lubricating the bearing assembly. In order to retain lubricant in the area 26, the axial ends thereof are provided with seal assemblies 27. The seal assemblies 27 consist of an outer race ring associated member 11 and an inner race ring associated member 12. The seal assembly 27 is a combination lip seal and labyrinth seal wherein the outer raceway associated member 11 spans the distance between the inner diameter of the outer raceway and the outer diameter of the inner raceway while the inner raceway associated member 12 terminates radially inwardly of the inner diameter of the outer raceway but cooperates with the member 11 to provide a tortuous path space 28 therebetween defining the labyrinth seal.

As best illustrated in FIG. 3, the member 11 consists of a single ring of elastomer material 30 and a single metal annulus ring 31 which are preferably bonded together. The annulus 31 has a central axially extending portion 32 terminating on the axially outer end thereof in a radially inwardly directed portion 33 and on the axially inner end thereof in a radially outwardly directed portion 34. The radially outwardly directed portion 34 terminates on its outer diameter end with an axially outwardly extending flange portion 35. The flange portion 35 extends axially outwardly beyond the axially outermost end of the portion 32.

The elastomer portion 30 has a face 36 which is configured so as to mate with the axially inner face of the portion 33 and 34, the radially inner face of the portion 32 and the radially outer face of the portion 35 of the annulus 31. The elastomer member extends radially outwardly from the outer diameter face of the portion 35 and has an axially inner bead portion 38 having its outer diameter 39 extending radially beyond the outer diameter 40 of the axially outermost portion which overlies the annulus portion 35. The bead 38 is adapted to be received in the groove 20 of the outer race ring 10 in a press-fit relation whereby the member 11 is retained in position attached to the outer race ring 10. When assembled in the groove 20, a circumferential space 43 extends between the outer diameter portion 40 and the inner diameter of the reduced area 19. The space 43 terminates at the bead 38.

The portion of the elastomer 30 which extends radially beyond the outer diameter of the flange 35 of the metal annulus is of sufficient thickness so that the outer diameter of the metal annulus lies at approximately the same plane as the normal inner diameter of the outer race ring when the element 11 is in position in the bearing assembly. The inner diameter of the metal annulus 31 terminates in spaced relation to the outer diameter 23 of the inner raceway. The metal annulus never contacts either of the race rings 10, 13. An axially inwardly extending flange portion 44 of the elastomer 30 projects from adjacent the inner diameter of the annulus. The portion 44 is integral with the outer diameter portion 45 of the elastomer, including the bead 39, through a contoured thin cross section ring portion 46 which is bonded to the metal annulus at the face 36. The portion 44 terminates on its axially inner end in a radially inwardly directed lip 47. The lip 47 is dimensioned to span the space between the inner diameter of the metal annulus 31 and the outer diameter 23 of the inner race ring 13. The lip 47 contacts the inner diameter 23 providing a seal at the interface 48 therebetween.

The seal element 11 provides a seal for the area 26 which sealingly contacts both the inner race ring 13 and the outer race ring 11 and which spans the distance therebetween. A seal at the outer race ring 11 is formed by the circumferential contact fit between the bead 39 and the groove 20. The seal with the inner race ring 13 is provided at the interface 48 by the lip 47 which depends from the axial portion 44.

The lip seal at the interface 48 will prevent lubricating material contained within the area 26 from flowing out of the axial ends of the bearing assembly. Further, due to the configuration of the elastomer portion of the element 11 adjacent its inner diameter, the provision of lubricant under pressure in the area 26 aids in maintaining the seal at the interface 48. It can be seen that a presence of a pressure in the area 26 will press against the outer diameter of the axial flange portion 44 urging it radially inwardly whenever a pressure differential exists between the area 26 and the external atmosphere. This radial inward urging of the axially inwardly directed flange 44 will press the lip 47 against the outer diameter 23 of the inner race ring at the interface 48 due to the elastomeric composition of the portions 44 and 47 in response to the pressure differential.

In order to prevent entrance of foreign material into the area of the lip seal and therethrough into the lubricant area 26, a tortuous path labyrinth seal is provided axially outward of the member 11. The labyrinth is created by the interfit between the element 11 and the element 12.

The element 12 is a substantially U-shaped cross section metal ring having a radially extending wall 50 bounded on the inner diameter thereof by an axially inwardly extending leg 51 and on the outer diameter thereof by an axially inwardly extending leg 52. The leg 51 has an inner diameter substantially equal to the outer diameter 23 of the inner race ring 13 and is placed therearound in press-fit relationship therewith. It is to be understood that the leg 51 can be attached to the inner race ring 13 by any desired means including the above-described press-fit relationship.

The leg 51 extends axially inwardly radially below the inner diameter of the radially inwardly extending portion 33 of the metal annulus of the element 11 and radially below a portion of the axially inwardly extending elastomer flange 44. The axially innermost end of the leg 51 terminates in spaced axial relation from the lip 47. The radially extending wall 50 of the element 12 projects radially outwardly from the axially outer end of the leg 51 in spaced axial relation to the axially outermost portions of the element 11 and terminates in the leg 52. The outer diameter of the leg 52 is in radially close spaced relation to the inner diameter of the flange 35 of the metal annulus 32 and projects axially inwardly towards the radially outwardly extending portion 34 of the annulus 31 between the portions 32 and 35 of the annulus. A thin circumferential gap 49 exists between the leg 52 and the flange 35. The leg 52 extends axially inwardly approximately the same distance as the leg 51 and overlies the portion 33 and part of the portion 32 of the annulus 31. It can therefore be seen that the space 28 between the element 11 and the element 12 defines a labyrinth seal. Because the element 12 and the annulus 31 of the element 11 are preferably both made of metal or another rigid material such as some plastics, operation of the bearing assembly even under the most extreme conditions, will not cause contact therebetween. Further, the provision of the annulus provides rigid radial support for the outer diameter portions of the elastomer portion 30 to aid in retaining the bead 39 in the groove 20. The labyrinth seal effectively prevents foreign material from interfering with the operation of the lip seal due to the close space relation between the leg 52 and the flange portion 35 of the annulus, the close space relation between the leg 51 and the inner diameter of the annulus and the elastomer flange 44 and because of the close spaced axial relation between the elements 11,12 which provides a tortuous path 28 from the sealed area 26 to the external atmosphere.

FIG. 4 illustrates a modified flinger 60 similar to the flinger 12 which is restrained against axial and rotational movement by the provision of a plurality of tabs 61. The tabs 61 are radially inwardly extending portions of the radial wall 50, which are struck from corresponding portions of the axial leg 51.

FIG. 4 illustrates the tabs 61 as being four in number and being equidistantly spaced around the circumference of the flinger 60. It is to be understood, however, that any number of tabs may be used. As illustrated in FIG. 5, the tabs 61 are received in a circumferential groove 62 formed into the outer diameter 23 of the inner race ring 13 adjacent the axial ends thereof. As illustrated in FIG. 5, an interference fit may be provided for the tabs 61 by dimensioning the groove to be substantially the same in radial and axial direction as the dimensions of the tabs 61. The leading 63 and trailing 64 corners of the tabs 61 are preferably formed as sharp angles. Thus, the provision of the groove 62 and the interference fit between the tab 61 and the groove restrain the flinger against axial movement while the sharp corners 63 and 64 of the tabs 61 will bite into the metal of the race ring thereby restraining the flinger against rotational movement.

FIGS. 6 and 7 illustrate modifications of the groove and tab which require less accurate machining than the interference fit illustrated in FIG. 5. In FIG. 6 the groove 64 is formed with radially inwardly converging sidewalls while the bottom 67 of the tab 61 is formed by a straight axial wall intersecting with straight radial walls. The bottom wall 68 of the groove 64 preferably has an axial dimension which is less than the axial dimension of the bottom wall 67 of the tab. Therefore, the tab 61 will cut into the walls 65 of the groove to restrain the flinger against axial and rotational movement.

FIG. 7 illustrates another embodiment where the groove 69 is formed similarly to the groove 62 of FIG. 5. However, the tab 70 has a radially inwardly converging taper 71 at the bottom thereof. The groove 69 is preferably axially narrower than the widest portion of the tab 70. Therefore, the tab 70 will wedge-fit into the groove 69 to restrain the flinger 60 against axial and rotational movement.

It can therefore be seen from the above that my invention provides for a combination lip seal and labyrinth seal for use in connection with bearing assemblies which includes an outer race ring carried combination elastomer and metal element having a lip seal associated therewith for spanning the distance between the inner and outer race rings and an inner race ring carried metal element adapted to cooperate with the outer race ring carried element to define a labyrinth seal therebetween axially outward of the lip seal.

Although the teachings of my invention have herein been discussed with reference to specific theories and embodiments, it is to be understood that these are by way of illustration only and that others may wish to utilize my invention in different designs or applications.

I claim:

1. A combination lip and labyrinth seal for use in connection with bearing assemblies which comprises: a first member including a sealing lip, said first member having a single elastomer ring portion adapted to span the distance between an inner and outer race ring of a bearing assembly having one radial end thereof terminating in a radially projecting bead and the other radial end thereof terminating in a sealing lip, the area between said radial ends including an axially outwardly opening circumferential groove, a rigid annulus attached to said elastomer member, said annulus terminating in spaced relation from said radial ends, said annulus located on the axially outer side of the said elastomer, and said annulus including an axially outwardly opening circumferential groove dimensioned to fit within the said groove of the said elastomer in mating engagement therewith, a rigid labyrinth defining member, said labyrinth defining member adapted to be positioned axially beyond said first member, said labyrinth defining member having a radially projecting portion intermediate two axially inwardly projecting portions, one of said axially inwardly projecting portions projecting within the said circumferential grooves in close spaced relation to the outer diameter thereof and terminating therein in spaced relation to the bottom thereof, and the other of said axially inwardly projecting legs extending axially inwardly of adjacent portions of the said first member and terminating in axially spaced relation to the said lip.

2. A bearing assembly comprising inner and outer concentric spaced apart race rings having axial ends, antifriction roller elements entrapped between said race rings, a lubricating area between said race rings intermediate the axial ends thereof, an inner diameter circumferential groove adjacent each of the axial ends of said outer race rings, a seal assembly sealing each of the axial ends of said bearing assembly, each of said seal assemblies including, an elastomer ring element, said elastomer ring element having an outer diameter bead adapted to be received in said circumferential groove in sealing relation therewith, said elastomer element having a radially extending portion extending from said bead portion to close spaced relation with said inner race ring, said radial portion having an axially outwardly opening circumferential groove therein, said radial portion terminating adjacent said inner race ring in an axially inwardly directed flange portion, said axially inwardly directed flange portion terminating in a radially inwardly directed lip seal dimensioned to sealingly engage the outer diameter of the said inner race ring, a rigid annulus member bonded to said elastomer member on the axially outermost face of said radial member, said annulus having inner and outer diameters spaced from said race rings, said annulus having an axially outwardly opening channel therein received in said axially outwardly opening channel of said elastomer member, a labyrinth defining member, said labyrinth defining member composed of rigid material having a first axially extending leg portion carried by said inner race member, said first leg portion underlying in close spaced relationship therewith the inner diameter of said annulus and portions of said axially inwardly extending flange of said elastomer member, said labyrinth member including a radial ring portion extending radially outwardly from the axially outer end of said first leg member in close spaced relation to portions of said annulus and terminating in its outer diameter with an axially inwardly extending second leg member, said second leg member projecting into the said annulus groove terminating in spaced axial relation with the bottom wall thereof and lying in close spaced radial relation with the outer diameter wall thereof, the outer diameter wall of said circumferential annulus groove extending axially outwardly beyond the inner diameter wall thereof.

3. The bearing assembly of claim 2 wherein the annulus is bonded to the elastomer member.

4. The combination of claim 1 wherein the said labyrinth defining member includes a plurality of radially inwardly projecting tabs, said tabs projecting radially inwardly of said axially inwardly projecting portions.

5. The bearing assembly of claim 2 wherein the said labyrinth defining member includes a plurality of radially inwardly projecting tabs, said tabs projecting radially inwardly of said first axially extending leg portion, said inner race ring including a circumferential groove therein, and said tabs projecting into said grooves whereby said labyrinth defining member is restrained against axial and rotational movement.

6. The assembly of claim 5 wherein an interference fit exists between the said groove and the said tabs.

7. The assembly of claim 6 wherein the said tabs have sharp bend leading and trailing corners on the inner diameter thereof.

8. The bearing assembly of claim 5 wherein the said groove converges radially inwardly and has an inner diameter bottom wall having an axial dimension less than the axial dimension of the inner diameter of the said tab whereby the said tab is wedge-fit into the said groove.

9. The bearing assembly of claim 5 wherein the said tab has axial end walls which radially inwardly converge, the inner diameter of the said tab having an axial dimension less than the axial dimension of the said groove, and portions of the said tab spaced from the inner diameter wall thereof having an axial dimension greater than the axial dimension of the said groove whereby the said tab is wedge-fit received into the said groove.